July 28, 1936.  C. J. DUNZWEILER ET AL  2,049,200

STORAGE BATTERY

Filed Aug. 10, 1933

INVENTORS:
CARL J. DUNZWEILER
ANTHONY C. ZACHLIN

Kwis Hudson & Kent
ATTORNEYS

Patented July 28, 1936

2,049,200

UNITED STATES PATENT OFFICE 2,049,200

STORAGE BATTERY

Carl J. Dunzweiler, Cleveland, and Anthony C. Zachlin, South Euclid, Ohio, assignors to Willard Storage Battery Company, Cleveland, Ohio, a corporation of West Virginia Application August 10, 1933, Serial No. 684,513

3 Claims. (Cl. 136—81)

This invention relates to storage batteries, and has particular reference to improvements in the manner of supporting the plates and the separators by means of certain cooperating supporting parts of the container.

The invention has particular utility in a battery composed of unusually thick and heavy plates and a relatively small number of plates for performance conditions quite different from those obtainable from batteries heretofore used, the construction and arrangement being such that different and more effective supporting relationship between the container and the plates and separators is required.

The principal object of the present invention is to so interlock the separators and plates with reference to the supporting parts of the container that the plates, notwithstanding their thickness and weight, and the separators will be maintained in their proper and previously determined relationship in the container while at the same time a high degree of compactness and economy of materials are obtained by a novel and effective disposition of the overlapping or interlocking parts.

In a companion application Serial No. 684,512, filed of even date herewith, we have disclosed certain novel plate and separator supports adaptable for a battery having a relatively large ampere-hour capacity. In the present application we have shown a construction which accomplishes the object stated above but which is especially adapted for a smaller battery, i. e., smaller in size and having a smaller number of plates.

The invention may be briefly summarized as consisting in certain details of construction and combinations and arrangements of parts which will be described in the specification and set forth in the appended claims.

In the accompanying sheet of drawings, wherein we have shown an embodiment which is very satisfactory:

Figure 3:
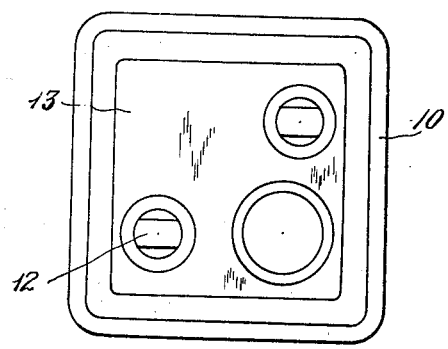
Fig. 3 is a top plan view.

Referring now to the drawing, the battery is provided with a container 10 which may be made of any of the materials used in making storage battery containers, such as rubber. The battery here shown contains only two plates 11 and consists of a single cell, but so far as certain features of the invention are concerned, we do not desire to be confined to a single cell battery nor to one having only two plates, although for certain uses a single cell, two-plate battery having relatively thick plates, as herein illustrated, which therefore contain a large percentage of active material, answers the requirements very effectively.

The plates are provided at their upper ends with posts 12 which extend through the cover 13 and may be sealed therein in any suitable manner. The details of the cover are not material to the present invention. The plates rest upon bottom rests in the form of ribs 14 which extend upwardly from the bottom of the container and also extend upwardly for a distance along the side walls and then taper to the side walls, as shown at 14$^a$. The upward extensions of the bottom rests are just far enough to snugly receive the two plates between them, and they therefore serve to prevent lateral movement of the plates in a direction at right angles to the sides of the plates. Each of the plates is provided at the bottom with downwardly projecting lugs 15 so spaced that when the plate rests on the bottom rest, the two lugs fit over and on the outside of the upper portions of the bottom rest closely adjacent thereto so as to hold the lower ends of the plates against lateral movement in a direction edgewise of the plate.

We might state that the grids used in forming the plates constitute the subject matter of an application Serial No. 684,511, filed of even date herewith in the name of Anthony C. Zachlin, these grids having wide upright side walls and top and bottom walls forming a deep rectangular frame with suitable ribs and webs which retain the active material in the grid, and these lugs 15 are, of course, formed on the bottom walls of the grids.

Figure 4:
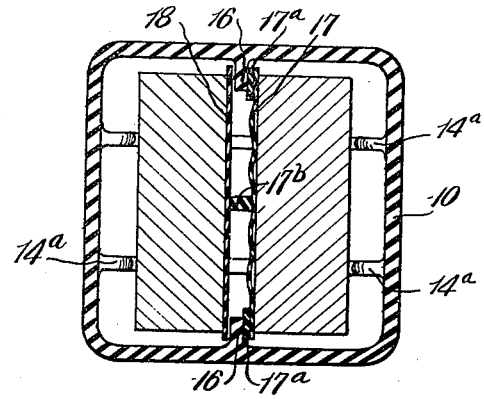
Fig. 4 is a transverse sectional view substantially along the line 4—4 of Fig. 2.
Figure 1:
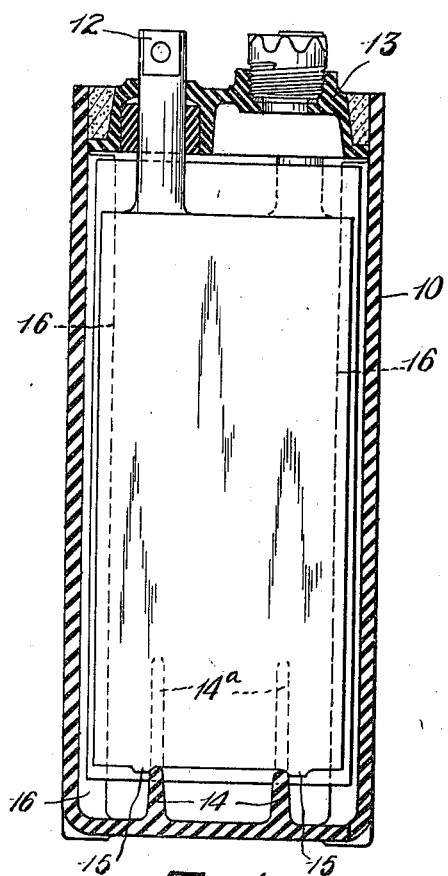
Fig. 1 is a vertical sectional view through the battery, the section being taken parallel to the plates.
Figure 2:
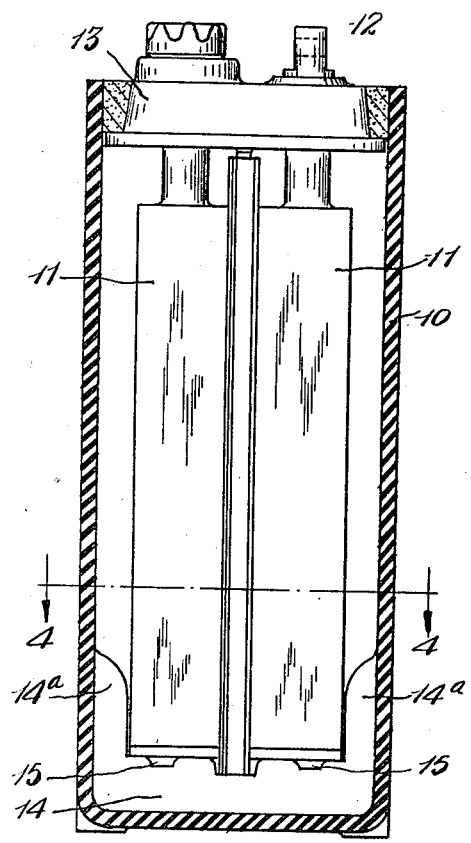
Fig. 2 is a similar view with the section taken at right angles to the section of Fig. 1.

It will be noted particularly by reference to Figs. 2 and 4 that the two opposite side walls of the container are provided with oppositely disposed inwardly projecting ribs 16 which project a short distance inwardly between the plates, but the plates preferably do not contact these ribs, for we provide between the plates a double separator composed in this instance of two separators 17 and 18 and extend these laterally outwardly alongside the ribs 16 beyond the edges of the plates. As herein illustrated, the separator 17 is of corrugated form and is provided at its upright edges with relatively thin ribs 17$^a$ which may be of rubber, these ribs engaging the adjacent faces of the container rib 16, and at the center it is provided with a relatively deep rib 17b. The separator 17 may be formed of different materials. For example, it may consist of a thread-rubber separator formed in accordance with the well known Willard patents, or it may be formed in accordance with the teachings of the Beckmann Patents No. 1,745,657 and No. 1,831,406; or it may be formed in accordance with the teachings of the Reinhardt application Serial No. 698,860 covering a modified Beckmann separator. In all three instances the separator is of the microporous type. The separator 18 may consist of a perforated sheet of rubber. As before stated, it overlaps the container ribs 16 and is thus supported at its edges, and at its middle it engages and is therefore supported by the rib 17b of the separator 17. The separators extend beyond the plates in all directions, and in order that they may extend below the plates, the ribs 14 constituting the bottom rest for the plates are notched at the middle, as shown at 14b, and the bottom portions of the separators extend into these notches. We might state that the separator 17 is preferably placed against the negative plate and the separator 18 against the positive plate, these separators serving to hold the active material in the plates. The outer sides of the grids used in the plates are so formed that they effectively prevent the material from falling out of the rear sides of the plates.

With the construction above described, the plates and also the separators are amply supported and there is very little danger of warpage of the plates or of displacement by rough handling.

While we have shown the preferred construction, we do not desire to be confined to the precise details and arrangements shown, but aim in our claims to cover all modifications which do not involve a departure from the spirit and scope of our invention.

Having thus described our invention, we claim:

1. In a storage battery, a container, a battery element in the container comprising positive and negative plates and intervening insulation, a bottom rest in the form of one or more ribs at the bottom of the container and engaged by the lower edges of the plates, the bottom rest rib or ribs extending vertically up along two opposite walls of the container and engaging outer sides of the plates, the other two opposite walls of the container having vertical ribs extending inwardly between the plates for the major portion of the height thereof, and the bottom rest and the plates having engaging portions which limit the movement of the plates in a direction edgewise of the latter whereby the plates are held from movement in any direction in the container.

2. In a storage battery, a container, a battery element in the container comprising positive and negative plates and insulation therebetween including two insulating sheets, two opposite walls of the container having vertical ribs projecting inwardly between the plates and between the sheets of the insulation for the major portion of the height thereof, and the insulation having vertically extending means holding the middle portions of the sheets apart and forming vertical circulation spaces between the sheets.

3. In a storage battery, a container, a battery element in the container comprising positive and negative plates and insulation therebetween including two insulating sheets which extend beyond the sides of the plates in all directions, two opposite walls of the container having vertical ribs projecting inwardly between the plates and between the sheets of the insulation for the major portion of the height thereof, and the insulation having vertically extending means holding the middle portions of the sheets apart and forming vertical circulation spaces between the sheets.

CARL J. DUNZWEILER.
ANTHONY C. ZACHLIN.